(12) United States Patent
Kim et al.

(10) Patent No.: US 9,346,986 B2
(45) Date of Patent: May 24, 2016

(54) ADHESIVE FILM, ADHESIVE COMPOSITION FOR THE SAME, AND DISPLAY APPARATUS INCLUDING THE SAME

(71) Applicant: CHEIL INDUSTRIES INC., Gumi-si, Gyeongsangbuk-do (KR)

(72) Inventors: Lee June Kim, Uiwang-si (KR); Ki Yong Kim, Uiwang-si (KR); Jee Hee Kim, Uiwang-si (KR); Chan Woo Kim, Uiwang-si (KR); Sung Hyun Mun, Uiwang-si (KR); Ik Hwan Cho, Uiwang-si (KR); In Cheon Han, Uiwang-si (KR)

(73) Assignee: CHEIL INDUSTRIES INC., Gumi-si (KR)

( * ) Notice: Subject to any disclaimer, the term of this patent is extended or adjusted under 35 U.S.C. 154(b) by 19 days.

(21) Appl. No.: 14/141,410

(22) Filed: Dec. 26, 2013

(65) Prior Publication Data

US 2014/0186604 A1    Jul. 3, 2014

(30) Foreign Application Priority Data

Dec. 27, 2012   (KR) ................. 10-2012-0155612

(51) Int. Cl.
| | |
|---|---|
| C09J 7/00 | (2006.01) |
| C09J 175/04 | (2006.01) |
| C09J 133/08 | (2006.01) |
| C09J 175/06 | (2006.01) |
| C09J 7/02 | (2006.01) |

(Continued)

(52) U.S. Cl.
CPC ........... *C09J 175/06* (2013.01); *C08G 18/3206* (2013.01); *C08G 18/4825* (2013.01); *C08G 18/6674* (2013.01); *C08G 18/672* (2013.01); *C08G 18/755* (2013.01); *C09J 7/00* (2013.01); *C09J 7/0207* (2013.01); *C09J 133/08* (2013.01); *C09J 133/14* (2013.01); *C09J 2201/622* (2013.01); *C09J 2203/318* (2013.01); *C09J 2205/114* (2013.01); *C09J 2433/00* (2013.01); *C09J 2475/00* (2013.01);

(Continued)

(58) Field of Classification Search
None
See application file for complete search history.

(56) References Cited

U.S. PATENT DOCUMENTS

2009/0246516 A1* 10/2009 Murayama et al. ........... 428/338
2012/0114953 A1*  5/2012 Ogawa et al. ............. 428/423.1

FOREIGN PATENT DOCUMENTS

| CN | 1324389 A | 11/2001 |
|---|---|---|
| CN | 101595191 A | 12/2009 |

(Continued)

OTHER PUBLICATIONS

Measurement of the Glass Transition Temperature Using Dynamic Mechanical Analysis. TA Instruments. http://www.tainstruments.com/pdf/literature/TS64.pdf. As viewed on Jun. 29, 2015.*

(Continued)

*Primary Examiner* — Robert C Boyle
*Assistant Examiner* — Stephen Rieth
(74) *Attorney, Agent, or Firm* — Lewis Roca Rothgerber Christie LLP

(57) ABSTRACT

An adhesive film, an adhesive composition for the same, and a display apparatus including the same. The adhesive film includes a urethane functional group, has a glass transition temperature (Tg) of about 30° C. or less, a loss modulus of about $4\times10^4$ dyn/cm$^2$ to about $8\times10^4$ dyn/cm$^2$ upon frequency sweep testing under conditions of a strain of 3%, 60° C. and 1 rad/s, and tan δ of about 0.2 to 0.55 upon frequency sweep testing under conditions of a strain of 3%, 60° C. and 1 rad/s.

16 Claims, 1 Drawing Sheet

(51) Int. Cl.
*C08G 18/48* (2006.01)
*C08G 18/66* (2006.01)
*C08G 18/67* (2006.01)
*C08G 18/75* (2006.01)
*C08G 18/32* (2006.01)
*C09J 133/14* (2006.01)

(52) U.S. Cl.
CPC ...... *G02F 2202/28* (2013.01); *Y10T 428/2848* (2015.01); *Y10T 428/2896* (2015.01)

(56) References Cited

FOREIGN PATENT DOCUMENTS

| CN | 101600771 A | 12/2009 |
|---|---|---|
| KR | 10-2012-0133890 A | 12/2012 |
| WO | WO 2005/019369 A1 | 3/2005 |

OTHER PUBLICATIONS

Xylene resin NIKANOL. Fudow. http://www.fudow.co.jp/en/products/nikanol.html. As viewed on Jun. 29, 2015.*

Myasnikova, L. P. Transitions and Relaxations. Encyclopedia of Polymer Science and Technology. John Wiley & Sons, Inc. 2010.*

SIPO Office action dated Feb. 11, 2015 in corresponding application No. CN 201310741383.3, 7 pages.

KIPO Office action dated Feb. 11, 2015 in priority application No. KR 10-2012-0155612, 4 pages.

Taiwanese Patent Office action dated Dec. 15, 2014, in corresponding application No. 102148694, 8 pages.

* cited by examiner

ADHESIVE FILM, ADHESIVE COMPOSITION FOR THE SAME, AND DISPLAY APPARATUS INCLUDING THE SAME

CROSS-REFERENCE TO RELATED APPLICATION

This application claims priority to and the benefit of Korean Patent Application No. 10-2012-0155612, filed in the Korean Intellectual Property Office on Dec. 27, 2012, the entire content of which is incorporated herein by reference.

BACKGROUND

1. Field

The following description relates to an adhesive film, an adhesive composition for the same, and a display apparatus including the same.

2. Description of the Related Art

An optical clear adhesive (OCA) film is an adhesive film used for interlayer adhesion when stacking components in an optical display device or for attaching a touch screen for mobile phones. For example, a capacitive touchpad is attached to a window or a film using an adhesive film to sense change in capacitance of the window or film, thereby exhibiting inherent properties thereof. In such a touchpad, the adhesive film is stacked between a window glass and a touch screen panel (TSP) sensor glass.

An OCA film enhances the clearness (i.e., optical clarity) of a display screen, exhibits superior adhesion to double-sided tapes, and has a high transmittance similar to glass by allowing 97% or more of light to be transmitted therethrough. The OCA film may be applied to cell phones, tablet PCs, TVs or the like, which have medium or large display screens.

A small display (for example, less than 5 inches) has a small area to which an adhesive film is attached. As a result, such a display does not suffer from warpage or spots even under severe conditions (for example, high temperature and high humidity of 60° C./90%). However, medium and large (for example, 5-50 inches) displays, which are non-mobile, have a large area to which the adhesive film is attached, and may suffer from warpage and spots due to strain at an edge thereof.

SUMMARY

In accordance with one embodiment of the present invention, an adhesive film may include a urethane functional group and may have a glass transition temperature (Tg) of about 30° C. or less, a loss modulus of about $4 \times 10^4$ dyn/cm$^2$ to about $8 \times 10^4$ dyn/cm$^2$ upon frequency sweep testing under conditions of a strain of 3%, 60° C. and 1 rad/s, and tan δ of about 0.2 to 0.55 upon frequency sweep testing under conditions of a strain of 3%, 60° C. and 1 rad/s.

In accordance with another embodiment of the present invention, an adhesive composition may include: (A) a urethane(meth)acrylate copolymer; (B) a (meth)acrylic copolymer; (C) an initiator; and (D) a crosslinking agent, wherein the (A) urethane(meth)acrylate copolymer may be present in an amount of about 11 wt % to 40 wt % based on the total amount of (A), (B), (C), and (D).

In accordance with a further embodiment of the present invention, a display apparatus may include: an optical film; and an adhesive film attached to one or both sides of the optical film.

BRIEF DESCRIPTION OF THE DRAWINGS

The above and other aspects, features and advantages of the invention will become apparent from the detailed description of the following embodiments given in conjunction with the accompanying drawings, in which.

DETAILED DESCRIPTION

Figure 1:
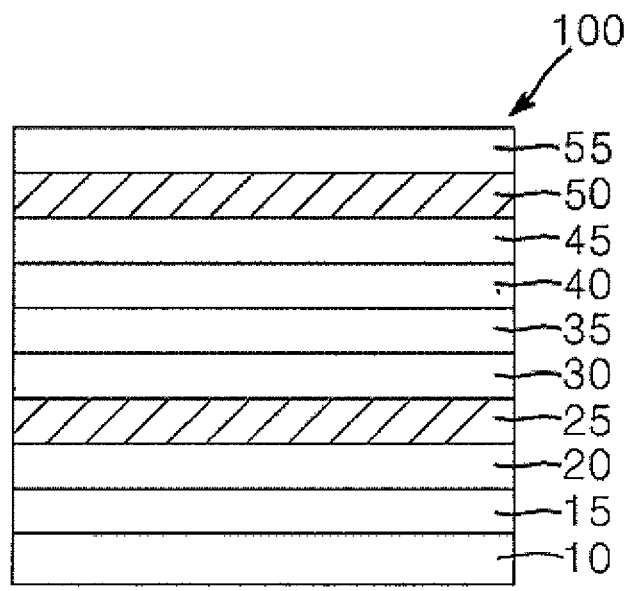
FIG. 1 is a sectional view of a display unit of an organic light emitting device in accordance with one embodiment of the present invention.

Hereinafter, embodiments of the present invention will now be described in more detail with reference to the accompanying drawings. It should be understood that the present invention is not limited to the following embodiments and may be embodied in different ways, and that the embodiments are given to provide complete disclosure of the invention and to provide thorough understanding of the invention to those skilled in the art. Descriptions of components not related to the present invention are omitted for clarity. Like components will be denoted by like reference numerals throughout the specification. Expressions such as "at least one of," when preceding a list of elements, modify the entire list of elements and do not modify the individual elements of the list. Further, the use of "may" when describing embodiments of the present invention refers to "one or more embodiments of the present invention."

As used herein, terms such as "upper side" and "lower side" are defined with reference to the accompanying drawings. Thus, it will be understood that the term "upper side" may be used interchangeably with the term "lower side". In addition, the term "(meth)acrylate" may refer to acrylates and/or methacrylates, and the term "copolymer" may refer to oligomers, polymers, or resins.

An adhesive film according to one embodiment of the invention may have a loss modulus of about $4 \times 10^4$ dyn/cm$^2$ to about $8 \times 10^4$ dyn/cm$^2$ upon frequency sweep testing under conditions of a strain of 3%, 60° C. and 1 rad/s. For example, the adhesive film may have a loss modulus of $6 \times 10^4$ dyn/cm$^2$ to $6.5 \times 10^4$ dyn/cm$^2$. When the loss modulus of the adhesive film is less than about $4 \times 10^4$ dyn/cm$^2$, the adhesive film may cause warpage when attached to a display panel and may suffer from spots and deterioration in adhesion when a display is operated for 250 hours under severe conditions. When the loss modulus of the adhesive film is greater than about $8 \times 10^4$ dyn/cm$^2$, the adhesive film may suffer from occurrence of spots and shrinkage.

The adhesive film may have a glass transition temperature (Tg) of about 30° C. or less, for example, about −20° C. or less, or about −60° C. to about −20° C. For example, the adhesive film may have a glass transition temperature (Tg) of about −60, −59, −58, −57, −56, −55, −54, −53, −52, −51, −50, −49, −48, −47, −46, −45, −44, −43, −42, −41, −40, −39, −38, −37, −36, −35, −34, −33, −32, −31, −30, −29, −28, −27, −26, −25, −24, −23, −22, −21 or −20° C. When the glass transition temperature of the adhesive film is greater than 30° C., the adhesive film may become hard and may be vulnerable to impact.

The adhesive film may have a storage modulus of about $4 \times 10^4$ dyn/cm$^2$ or more, for example, from about $6 \times 10^4$ dyn/cm$^2$ to about $1 \times 10^6$ dyn/cm$^2$ upon frequency sweep testing under conditions of a strain of 3%, 60° C. and 1 rad/s. Within this range, the adhesive film may prevent shrinkage under high temperature and high humidity conditions.

The loss modulus and storage modulus may be measured as described in the examples.

The adhesive film may have a tan δ (ratio of loss modulus to storage modulus) of about 0.2 to about 1.0, for example, about 0.2 to about 0.55 upon frequency sweep testing under conditions of a strain of 3%, 60° C. and 1 rad/s. For example, the adhesive film may have a tan δ of about 0.2, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54 or 0.55. Within this range, the adhesive film may not suffer from occurrence of spots after driving a display for 250 hours under severe conditions, and thus may have excellent reliability.

The adhesive film may have a transmittance of about 90% or more and a haze of about 0.5% or less at a wavelength from 400 nm to 700 nm. Within this range, the adhesive film may have high transparency, and thus may be applied to touch panels and the like. In one embodiment, the adhesive film has a transmittance from about 90% to about 99%, and a haze from about 0.1% to about 0.5%.

The adhesive film may have a peel strength from about 1000 gf/25 mm to about 6000 gf/25 mm. Within this range, the adhesive film may exhibit sufficient adhesion and excellent reworkability. Peel strength may be measured as described in the examples.

The adhesive film may include a urethane functional group. The urethane functional group may be derived from a urethane(meth)acrylate copolymer of a composition for adhesive films. The urethane functional group may be present in the backbone of the urethane(meth)acrylate copolymer. The urethane(meth)acrylate copolymer may be included in the adhesive composition for adhesive films to relieve strain of the adhesive film at high temperature, thereby preventing warpage of the adhesive film while relieving stress of the adhesive film.

In the adhesive film, the urethane functional group may be present in an amount of about 3 wt % to about 20 wt %, for example, about 3, 4, 5, 6, 7, 8, 9, 10, 11, 12, 13, 14, 15, 16, 17, 18, 19 or 20 wt %. Within this range, the adhesive film may exhibit improved elasticity.

The adhesive film may include a non-curable compound. The non-curable compound does not include a functional group (for example, a double bond such as a vinyl group, a (meth)acrylate group, or the like) which may participate in curing of the adhesive composition for adhesive films. Accordingly, the non-curable compound does not participate in the curing reaction of the adhesive composition. Instead, the non-curable compound is a lipophilic molecule having multiple aromatic rings, has a stabilized planar structure due to the aromatic rings; and is capable of being stacked due to the strong attraction between un-localized electrons of the aromatic rings. As a result, although the non-curable compound does not participate in curing reaction, the non-curable compound remains in an original state instead of being leaked as a liquid phase from the adhesive film, thereby reducing curing shrinkage rate and suppressing formation of spots upon driving of LCDs.

The non-curable compound may have a moiety represented by Formula 1:

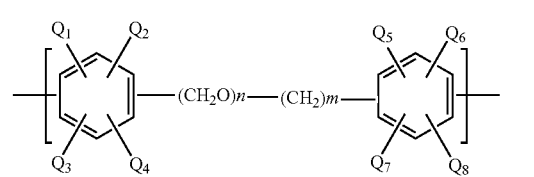

Formula 1 wherein n and m are independently an integer from 0 to 10, except for the case where both n and m are 0 (i.e., n and m are not both 0); $Q_1$, $Q_2$, $Q_3$, $Q_4$, $Q_5$, $Q_6$, $Q_7$ and $Q_8$ are independently selected from the group consisting of hydrogen, a linear or branched $C_1$ to $C_{10}$ alkyl group, a hydroxyl group, a $C_1$ to $C_{10}$ alkyl group substituted with a hydroxyl group, and -($-CH_2-$)$_s$-O-[$-CH_2-CH_2O-$]$_t$-$CH_2CH_2OH$ where s is an integer from 0 to 5 and t is an integer from 0 to 5; and at least one of $Q_1$, $Q_2$, $Q_3$, $Q_4$, $Q_5$, $Q_5$, $Q_7$ and $Q_8$ is a hydroxyl group, a $C_1$ to $C_{10}$ alkyl group substituted with a hydroxyl group, or -($-CH_2-$)$_s$-O-[$-CH_2-CH_2O-$]$_t$-$CH_2CH_2OH$ where s is an integer from 0 to 5 and t is an integer from 0 to 5.

For example, n and m may be independently an integer from about 0 to 5, or from about 0 to 1.

The linear or branched $C_1$ to $C_{10}$ alkyl group may be a linear or branched, unsubstituted $C_1$ to $C_{10}$ alkyl group.

In one embodiment, the non-curable compound may be represented by Formula 1-1 or 1-2:

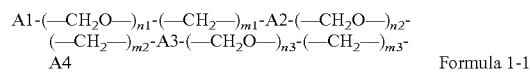

Formula 1-1

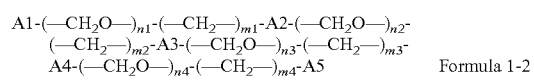

Formula 1-2 wherein n1, n2, n3, n4, m1, m2, m3 and m4 are independently an integer from 0 to 10, except for the cases that both n1 and m1 are all 0 (i.e., n1 and m1 are not both 0), both n2 and m2 are all 0 (i.e., n2 and m2 are not both 0), both n3 and m3 are all 0 (i.e., n3 and m3 are not both 0), or both n4 and m4 are all 0 (i.e., n4 and m4 are not both 0); and A1 to A5 are any one of the following formula (a), (b), (c) or (d):

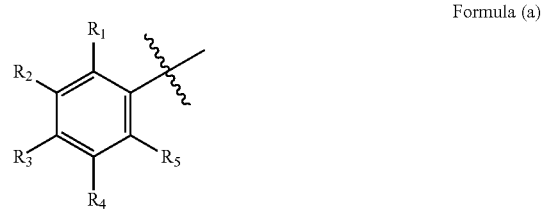

Formula (a)

Formula (b)

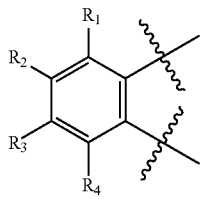

Formula (c)

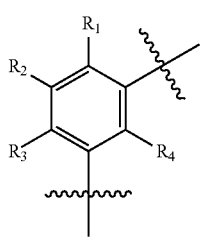

Formula (d)

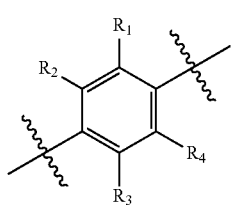

wherein $R_1$, $R_2$, $R_3$, $R_4$ and $R_5$ are the same or different, and are independently selected from the group consisting of hydrogen, a linear or branched $C_1$ to $C_{10}$ alkyl group, a hydroxyl group, a $C_1$ to $C_{10}$ alkyl group substituted with a hydroxyl group, and -(—$CH_2$—)$_s$-O-[—$CH_2$—$CH_2$O—]$_t$-$CH_2CH_2OH$ where s is an integer from 0 to 5 and t is an integer from 0 to 5; and at least one of $R_1$, $R_2$, $R_3$, $R_4$ and $R_5$ is a hydroxyl group, a $C_1$ to $C_{10}$ alkyl group substituted with a hydroxyl group, or -(—$CH_2$—)$_s$-O-[—$CH_2$—$CH_2$O—]$_t$—$CH_2CH_2OH$ where s is an integer from 0 to 5 and t is an integer from 0 to 5.

For example, n and m may be independently an integer from 0 to 1.

The linear or branched $C_1$ to $C_{10}$ alkyl group may be a linear or branched, unsubstituted, $C_1$ to $C_{10}$ alkyl group.

The non-curable compound may include about 2 to about 10, for example, about 4 to about 5 aromatic rings.

The hydroxyl group may be directly bonded to the aromatic ring in the non-curable compound, or may be introduced into the aromatic ring in the non-curable compound via a $C_1$ to $C_{10}$ alkyl group substituted with a hydroxyl group, -(—$CH_2$—)$_s$-O-[—$CH_2$—$CH_2$O—]$_t$-$CH_2CH_2OH$ where s is an integer from 0 to 5 and t is an integer from 0 to 5. The hydroxyl group of the non-curable compound may serve to enhance adhesion of an adhesive composition.

In one embodiment, the non-curable compound may be a xylene-formaldehyde resin. Here, the xylene-formaldehyde resin does not exhibit any migration. Further, the xylene-formaldehyde resin has good elasticity, heat resistance, optical properties, and low shrinkage.

The xylene-formaldehyde resin may include about 2 to about 10, for example, about 4 to about 5 aromatic rings.

Examples of the non-curable compound may be represented by Formulae 1a to 1e, without being limited thereto. These may be used alone or in combination of two or more thereof. For example, these compounds may be used as a mixture of two or more thereof.

Formula 1a

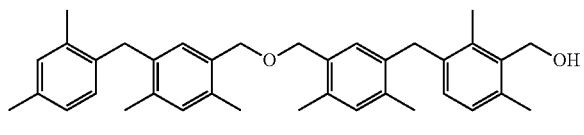

Formula 1b

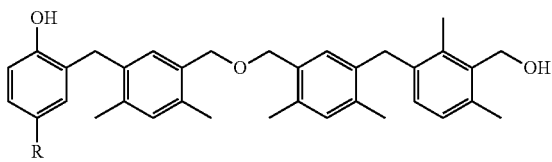

Formula 1c

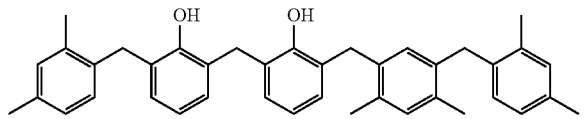

Formula 1d

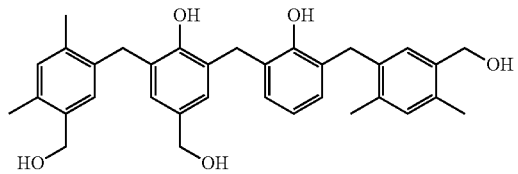

Formula 1e

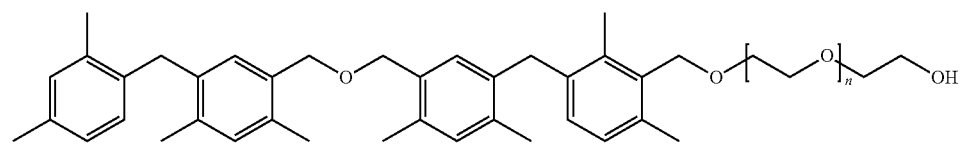

wherein R is hydrogen, a hydroxyl group or methyl group, and n is an integer from 0 to 5.

The non-curable compound may have a refractive index from about 1.47 to about 1.6, for example, about 1.47, 1.48, 1.49, 1.50, 1.51, 1.52, 1.53, 1.54, 1.55, 1.56, 1.56, 1.57, 1.58, 1.59 or 1.6, which increases the refractive index of the adhesive film composition, thereby reducing a difference in the refractive index between the window glass and the touch screen panel (TSP) glass, thereby preventing deterioration in clearness of a display screen due to refraction or reflection of light.

The non-curable compound may have a weight average molecular weight (Mw) of about 50 g/mol to about 3,000 g/mol. Within this range, the adhesive film may prevent occurrence of curing defect due to leakage of the non-curable material upon curing.

The non-curable compound may be present in an amount of about 0.1 wt % to about 20 wt % in the adhesive film. Within this range, the adhesive film may prevent occurrence of curing defect due to leakage of the non-curable material in a liquid phase. For example, the non-curable compound may be present in an amount of about 0.1 wt % to about 15 wt %, about 5 wt % to about 15 wt %, or about 8 wt % to about 12 wt %. For example, the non-curable compound may be present in an amount of about 0.1, 1, 2, 3, 4, 5, 6, 7, 8, 9, 10, 11, 12, 13, 14, 15, 16, 17, 18, 19 or 20 wt %.

The adhesive film may be used as an adhesive layer attached to one or both sides of an optical film and may be used to attach glass substrates, ITO (indium tin oxide) films, polycarbonate materials, or the like. Examples of the optical film may include transparent electrode films, such as touch panels, windows, polarizing plates, color filters, retardation films, elliptical polarizing films, reflective films, anti-reflective films, compensation films, brightness enhancing films, alignment films, light diffusion films, glass anti-scattering films, surface protective films, plastic LCD substrates, indium tin oxide (ITO), fluorinated tin oxide (FTO), aluminum doped zinc oxide (AZO), carbon nanotube (CNT) containing films, Ag nanowire containing films, graphene, and the like. For example, the adhesive film may be used as an OCA (optical clear adhesive) film and a touch panel film.

The adhesive film may be prepared from an adhesive composition including a urethane(meth)acrylate copolymer, a (meth)acrylic copolymer, an initiator, and a crosslinking agent. For example, the adhesive film may be prepared by coating the adhesive composition onto a release film (for example, a polyester film, such as a polyethylene terephthalate film), followed by UV curing. UV curing may be performed under conditions of about 50 mW/cm² to about 6000 mW/cm² for about 0.5 minutes to about 20 minutes. In one embodiment, UV curing is performed in an oxygen free environment. The coating may have a thickness from about 25 µm to about 2 mm, for example, from about 50 µm to about 1.5 mm, without being limited thereto.

The adhesive film may have a thickness (thickness except for the release film) from about 10 µm to about 2 mm, for example, from about 100 µm to about 1.5 mm, without being limited thereto.

In one embodiment, the adhesive composition may include (A) a urethane(meth)acrylate copolymer, (B) a (meth)acrylic copolymer, (C) an initiator, and (D) a crosslinking agent. The adhesive composition may further include (E) a non-curable compound.

Urethane(Meth)Acrylate Copolymer

The urethane(meth)acrylate copolymer may be included in the adhesive composition, thus prevent warpage of the adhesive film by relieving strain of the adhesive film at high temperature.

The urethane(meth)acrylate copolymer may have a urethane group and may be a monofunctional (meth)acrylate capped with a hydroxyl group or an alkoxy group at one end thereof. If the urethane(meth)acrylate copolymer is a polyfunctional (meth)acrylate, the adhesive composition may suffer from gelation upon addition of a crosslinking agent, thereby making it difficult to achieve film formation.

The urethane(meth)acrylate copolymer may have a structure represented by Formula 2:

Formula 2

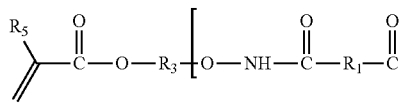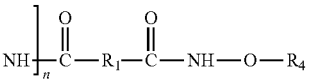

wherein $R_1$ is a functional group derived from a diisocyanate compound;

$R_2$ is a functional group derived from a polyol;

$R_3$ is a $C_1$ to $C_{10}$ alkylene group or a $C_6$ to $C_{20}$ arylene group;

$R_4$ is hydrogen or a $C_1$ to $C_{30}$ alkyl group;

$R_5$ is hydrogen or a $C_1$ to $C_5$ alkyl group; and n is an integer from 1 to 5.

In one embodiment, $R_1$ is a linear or branched hexamethylene group, a toluene group, a xylene group, or the like.

In one embodiment, $R_2$ is a linear or branched $C_1$ to $C_{10}$ alkylene group or the like.

The urethane(meth)acrylate copolymer may have a glass transition temperature from about −70° C. to about 50° C., for example, about −70, −60, −50, −40, −30, −20, −10, 0, 10, 20, 30, 40 or 50° C.

The urethane(meth)acrylate copolymer may have a viscosity at 25° C. from about 500 cps to about 100,000 cps, for example, from about 1,000 cps to about 50,000 cps. Within this range, curing shrinkage may be reduced.

The urethane(meth)acrylate copolymer may have a weight average molecular weight from about 1,000 g/mol to about 150,000 g/mol, for example, from about 1,000 g/mol to about 30,000 g/mol. For example, the urethane(meth)acrylate copolymer may have a weight average molecular weight of about 1000, 2000, 3000, 4000, 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000 or 30000 g/mol. Within this range, the adhesive film may exhibit excellent durability, adhesion, elongation, heat resistance, and moisture resistance.

The urethane(meth)acrylate copolymer may have a polydispersity index (PDI) of about 1 to about 5, for example, about 1, 2, 3, 4 or 5. Within this range, the urethane(meth)acrylate copolymer may have small (narrow) molecular weight distribution, thereby allowing the copolymer to exhibit uniform physical properties.

The urethane(meth)acrylate copolymer may be prepared by primarily polymerizing (in a first polymerization reaction) a polyol with a diisocyanate compound to provide a urethane oligomer, followed by secondarily polymerizing (in a second polymerization reaction) the urethane oligomer with a (meth) acrylate monomer.

The polyol may include at least one selected from the group consisting of polypropylene glycol, polypropylene diol, ethylene glycol, polyethylene glycol, propylene glycol, polytetramethylene glycol, tetramethylene glycol, 1,3-butanediol, 1,4-butanediol, 1,6-hexanediol, neopentyl glycol, polycarbonate polyol, polyesterpolyol containing polyester diol, and 1,4-cyclohexanedimethanol, without being limited thereto.

The diisocyanate compound may include at least one selected from the group consisting of isoprene based compounds, hexamethylene based compounds and toluene based compounds, without being limited thereto. For example, the diisocyanate compound may include at least one selected from the group consisting of isophorone diisocyanate (IPDI), hexamethylene diisocyanate, 2,4- or 2,6-toluene diisocyanate, 4,4'-diphenylmethane diisocyanate, xylene diisocyanate, hydrogenated diphenylmethane diisocyanate, naphthalene diisocyanate, and mixtures thereof.

The (meth)acrylate monomer is a (meth)acrylic acid ester having a hydroxyl group, and may include a (meth)acrylic acid ester having $C_2$ to $C_{10}$ alkyl group containing a hydroxyl group at one end thereof or in the structure thereof. In one embodiment, the (meth)acrylate monomer is 2-hydroxyethyl (meth)acrylate.

Polymerization of the polyol, the diisocyanate compound and the (meth)acrylate monomer may be performed by typical polymerization, for example, bulk polymerization, suspension polymerization, emulsion polymerization, or the like, without being limited thereto. Polymerization may be performed, for example, at about 40° C. to 90° C. for about 2 hours to 24 hours.

Polymerization may be performed in the absence of a catalyst or in the presence of a catalyst. In one embodiment, polymerization is performed using a catalyst to prepare a copolymer. The catalyst may be at least one selected from the group consisting of dibutyl tin dilaurate (DBTDL), triethylene diamine (TEDA), and 1,4-diazabicyclo[2.2.2]octane, without being limited thereto. The catalyst may be used in an amount of about 0.05 parts by weight to about 2 parts by weight based on 100 parts by weight of the polyol.

In the adhesive composition, the urethane(meth)acrylate copolymer may be present in an amount of about 11 wt % to about 40 wt %, for example, about 11 wt % to about 25 wt % in terms of the solid content (i.e., based on the total weight of the dried adhesive composition). For example, the urethane (meth)acrylate copolymer may be present in an amount of about 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 wt % in terms of the solid content. Within this range, the adhesive composition may allow adjustment of viscosity to enhance workability and may reduce curing shrinkage and film stress in reliability testing under high temperature and high humidity conditions.

In one embodiment, the urethane(meth)acrylate copolymer may be present in an amount of about 10 parts by weight to about 40 parts by weight, for example, about 10 parts by weight to about 25 parts by weight based on 100 parts by weight of the total amount of (A) and (B). For example, the urethane(meth)acrylate copolymer may be present in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 parts by weight based on 100 parts by weight of the total amount of (A) and (B). Within this range, the adhesive composition may exhibit improved reliability under high temperature and high humidity conditions.

In another embodiment, the urethane(meth)acrylate copolymer may be present in an amount of about 1 part by weight to about 20 parts by weight, for example, about 10 parts by weight to about 20 parts by weight, or about 10 parts by weight to about 15 parts by weight based on 100 parts by weight of the total amount of (A), (B) and (E). For example, the urethane(meth)acrylate copolymer may be present in an amount of about 1, 2, 3, 4, 5, 6, 7, 8, 9, 10, 11, 12, 13, 14, 15, 16, 17, 18, 19 or 20 parts by weight based on 100 parts by weight of the total amount of (A), (B) and (E). Within this range, the adhesive composition may exhibit improved reliability under high temperature and high humidity conditions.

(Meth)Acrylic Copolymer

The (meth)acrylic copolymer may be a copolymer of a monomer mixture including at least two of an alkyl(meth) acrylate containing a $C_1$ to $C_{20}$ alkyl group, a (meth)acrylate containing an alicyclic group, a monomer containing a hydroxyl group, a monomer containing a carboxylic acid, and a (meth)acrylate containing a hetero-alicyclic group.

The (meth)acrylic copolymer may be non-urethane(meth) acrylic copolymer, not comprising urethane functional group.

The alkyl(meth)acrylate containing a $C_1$ to $C_{20}$ alkyl group may include a linear or branched (meth)acrylic acid ester containing a unsubstituted $C_1$ to $C_{20}$ alkyl group. Examples of the alkyl(meth)acrylate containing a $C_1$ to $C_{20}$ alkyl group may include methyl(meth)acrylate, ethyl(meth)acrylate, propyl(meth)acrylate, butyl(meth)acrylate, pentyl(meth)acrylate, hexyl(meth)acrylate, ethylhexyl(meth)acrylate (EHA), heptyl(meth)acrylate, octyl(meth)acrylate, nonyl(meth)acrylate, decyl(meth)acrylate, undecyl(meth)acrylate, and dodecyl(meth)acrylate, without being limited thereto. These may be used alone or in combination of two or more thereof.

The alkyl(meth)acrylate containing a $C_1$ to $C_{20}$ alkyl group may be present in an amount of about 40 wt % to about 60 wt %, for example, about 40, 41, 42, 43, 44, 45, 46, 47, 48, 49, 50, 51, 52, 53, 54, 55, 56, 57, 58, 59 or 60 wt % in the monomer mixture or the (meth)acrylic copolymer. Within this range, the adhesive composition may not cause bubbling or peeling, and may provide enhanced or excellent durability. For example, the alkyl(meth)acrylate containing a $C_1$ to $C_{20}$ alkyl group may be present in an amount of about 50 wt % to about 60 wt %, or about 53 wt % to about 58 wt % in the monomer mixture or the (meth)acrylic copolymer.

The (meth)acrylate containing an alicyclic group may be a $C_3$ to $C_{20}$ (meth)acrylate containing an alicyclic group. Examples of the (meth)acrylate containing an alicyclic group may include isobornyl(meth)acrylate (IBOA), cyclohexyl (meth)acrylate, and cyclopentyl(meth)acrylate, without being limited thereto. These may be used alone or in combination thereof.

The (meth)acrylate containing an alicyclic group may be present in an amount of about 10 wt % to about 25 wt %, for example, about 10, 11, 12, 13, 14, 15, 16, 17, 18, 19, 20, 21, 22, 23, 24 or 25 wt % in the monomer mixture or the (meth) acrylic copolymer. Within this range, the adhesive composition may exhibit improved heat resistance, durability, and adhesion. For example, the (meth)acrylate containing an alicyclic group may be present in an amount of about 10 wt % to about 20 wt %, or about 10 wt % to about 14 wt % in the monomer mixture or the (meth)acrylic copolymer.

Examples of the monomer containing a hydroxyl group may include a (meth)acrylate containing a $C_1$ to $C_{20}$ alkyl group or a $C_5$ to $C_{20}$ cycloalkyl group having a hydroxyl group, such as 2-hydroxyethyl(meth)acrylate, 4-hydroxybutyl(meth)acrylate, 2-hydroxypropyl(meth)acrylate, 2-hydroxybutyl(meth)acrylate, 6-hydroxyhexyl(meth)acrylate, 1,4-cyclohexanedimethanol mono(meth)acrylate, chloro-2-hydroxypropyl(meth)acrylate, diethylene glycol mono(meth)acrylate; and unsaturated $C_2$-$C_{10}$ alcohol such as allyl alcohol, and the like, without being limited thereto. These may be used alone or in combination thereof.

The monomer containing a hydroxyl group may be present in an amount of about 20 wt % to about 35 wt %, for example, about 20, 21, 22, 23, 24, 25, 26, 27, 28, 29, 30, 31, 32, 33, 34 or 35 wt % in the monomer mixture or the (meth)acrylic copolymer. Within this range, the adhesive composition may have improved adhesion, exhibit excellent durability, and may not suffer from bubbling under humidity resistant testing conditions. For example, the hydroxyl group-containing monomer may be present in an amount of about 20 wt % to about 30 wt %, or about 25 wt % to about 30 wt % in the monomer mixture or the (meth)acrylic copolymer.

The monomer containing a carboxylic acid may include (meth)acrylic acid, itaconic acid, maleic acid, and fumaric acid. These may be used alone or in combination thereof.

The monomer containing a carboxylic acid may be present in an amount of about 0 to 15 wt %, for example, about 0, 1, 2, 3, 4, 5, 6, 7, 8, 9, 10, 11, 12, 13, 14 or 15 wt % in the monomer mixture or the (meth)acrylic copolymer. Within this range, the adhesive composition may exhibit improved adhesion and durability. For example, the monomer containing a carboxylic acid may be present in an amount of about 1 wt % to about 15 wt %, about 1 wt % to about 10 wt %, or about 4 wt % to about 8 wt % in the monomer mixture or the (meth)acrylic copolymer.

The (meth)acrylate containing a hetero-alicyclic group may include a (meth)acrylic monomer having a $C_4$ to $C_6$ homogeneous alicyclic ring having at least one of nitrogen, oxygen or sulfur. For example, the (meth)acrylate containing a hetero-alicyclic group may include (meth)acryloyl morpholine.

The (meth)acrylate containing a hetero-alicyclic group may be present in an amount of about 0 to 15 wt %, for example, about 0, 1, 2, 3, 4, 5, 6, 7, 8, 9, 10, 11, 12, 13, 14, or 15 wt % in the monomer mixture or the (meth)acrylic copolymer. Within this range, the adhesive composition may exhibit improved adhesion and may suppress corrosion of a transparent electrode film. For example, the hetero-alicyclic group-containing (meth)acrylate may be present in an amount of about 1 wt % to about 15 wt %, about 3 wt % to about 15 wt %, about 1 wt % to about 10 wt %, or about 4 wt % to about 8 wt % in the monomer mixture or the (meth)acrylic copolymer.

The (meth)acrylic copolymer may be prepared by adding an initiator to the monomer mixture, followed by partial polymerization. Partial polymerization may be performed until the (meth)acrylic copolymer becomes a liquid having a viscosity at 25° C. of about 500 cps to about 20,000 cps. Within this viscosity range, the adhesive composition may be easily coated and provide excellent workability. Polymerization may be performed by UV irradiation.

As the initiator, a photopolymerization initiator may be used. The photopolymerization is activated by UV or electron beans to promote radical reaction through activation of carbon-carbon double bonds in the adhesive film.

Examples of the photopolymerization initiator may include α-hydroxy ketone compounds, benzyl ketal compounds, and mixtures thereof, without being limited thereto. As the α-hydroxy ketone compounds, 1-hydroxy-cyclohexyl-phenyl-ketone, 2-hydroxy 2-methyl-1-phenyl-1-propanone, 2-hydroxy-1-[4-(2-hydroxyethoxy)phenyl]-2-methyl-1-propanone, or the like may be used. These initiators may be used alone or in combination thereof.

The initiator may be present in an amount of about 0.001 parts by weight to 3 parts by weight, for example, about 0.003 parts by weight to about 1 part by weight based on 100 parts by weight of the monomer mixture for preparation of the (meth)acrylic copolymer. Within this range, the adhesive composition may ensure low light leakage, and excellent durability and reliability.

The (meth)acrylic copolymer may have a glass transition temperature (Tg) of about −60° C. to about −5° C., for example, from about −30° C. to about −10° C. For example, the (meth)acrylic copolymer may have a glass transition temperature (Tg) of about −30, −29, −28, −27, −26, −25, −24, −23, −22, −21, −20, −19, −18, −17, −16, −15, −14, −13, −12, −11 or −10° C. Within this range, the adhesive composition may exhibit excellent properties in terms of workability, durability, and adhesion.

The (meth)acrylic copolymer may have a viscosity at 25° C. of about 500 cps to about 20,000 cps, for example, from about 1,000 cps to about 15,000 cps, or from about 1,000 cps to about 5,000 cps.

The (meth)acrylic copolymer may have a weight average molecular weight of about 10,000 g/mol to about 5,000,000 g/mol, for example, from about 1,000,000 g/mol to about 4,000,000 g/mol. Within this range, the adhesive composition may exhibit excellent durability and adhesion even after the adhesive composition is cured and left under high temperature and high humidity conditions for a long period of time.

The (meth)acrylic copolymer may be present in an amount of about 50 wt % to about 80 wt %, for example, from about 60 wt % to about 80 wt %, in the adhesive composition. For example, the (meth)acrylic copolymer may be present in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79 or 80 wt %. Within this range, the adhesive composition may provide good workability through adjustment of viscosity of the material, and may exhibit low curing shrinkage.

The (meth)acrylic copolymer may be present in an amount of about 60 parts by weight to about 90 parts by weight, for example, from about 75 parts by weight to about 90 parts by weight, based on 100 parts by weight of the total amount of (A) and (B). For example, the (meth)acrylic copolymer may be present in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89 or 90 parts by weight based on 100 parts by weight of the total amount of (A) and (B). Within this range, the adhesive composition may improve elasticity of the adhesive film.

The (meth)acrylic copolymer may be present in an amount of about 50 parts by weight to about 90 parts by weight, for example, from about 70 parts by weight to about 80 parts by weight, based on 100 parts by weight of the total amount of (A), (B) and (E). For example, the (meth)acrylic copolymer may be present in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89 or 90 parts by weight based on 100 parts by weight of the total amount of (A), (B) and (E). Within this range, the adhesive composition may prevent shrinkage of the adhesive film under high temperature and high humidity conditions.

Initiator

As the initiator, a photopolymerization initiator may be used. Details of the initiator are as described above.

The initiator may be present in an amount of about 0.001 parts by weight to about 3 parts by weight, for example, about 0.003 parts by weight to about 1 part by weight, based on 100 parts by weight of the total amount of (A) and (B), or the total amount of (A), (B) and (E) (when the amount of (E) is significant). Within this range, curing reaction may be completely achieved, and it may be possible to prevent deterioration in transparency due to any remaining initiator.

The initiator may be present in an amount of about 0.001 wt % to about 5 wt %, for example, about 0.001 wt % to about 1 wt % in the adhesive composition. Within this range, the adhesive composition may not suffer from deterioration in transmittance of the adhesive film due to the remaining initiator.

Crosslinking Agent

As the crosslinking agent, a polyfunctional (meth)acrylate curable by active energy rays may be used.

Examples of the polyfunctional (meth)acrylate may include: bi-functional (meth)acrylates, such as 1,4-butanedioldi(meth)acrylate, 1,6-hexanedioldi(meth)acrylate, 1,12-dodecanedioldi(meth)acrylate, neopentylglycoldi(meth)acrylate, polyethylene glycoldi(meth)acrylate, neopentylglycoladipatedi(meth)acrylate, dicyclopentanyldi(meth)acrylate, caprolactone-modifieddicyclopentenyldi(meth)acrylate, ethylene oxide-modifieddi(meth)acrylate, bis(meth)acryloxyethylhydroxylisocyanurate, allylatedcyclohexyldi(meth)acrylate, tricyclodecanedimethanol di(meth)acrylate, dimethyloldicyclopentane di(meth)acrylate, ethylene oxide-modifiedhexahydrophthalic aciddi(meth)acrylate, neopentylglycol-modifiedtrimethylpropanedi(meth)acrylate, adamantanedi(meth)acrylate, 9,9-bis[4-(2-acryloyloxyethoxy)phenyl]fluorene, or the like; tri-functional(meth)acrylates, such as trimethylolpropanetri(meth)acrylate, dipentaerythritoltri(meth)acrylate, propionate-modifieddipentaerythritoltri(meth)acrylate, pentaerythritoltri(meth)acrylate, propylene oxide-modifiedtrimethylolpropanetri(meth)acrylate, tri-functionalurethane(meth)acrylate, tris(2-(meth)acryloxyethyl) isocyanurate, or the like; tetra-functional(meth)acrylates, such as diglyceroltetra(meth)acrylate, pentaerythritoltetra(meth)acrylate, or the like; penta-functional(meth)acrylates, such as dipentaerythritolpenta(meth)acrylate, or the like; and hexa-functional(meth)acrylates, such as dipentaerythritolhexa(meth)acrylate, caprolactone-modifieddipentaerythritolhexa(meth)acrylate, hexa-functionalurethane(meth)acrylate (ex., reactants of isocyanate monomers and trimethylolpropanetri(meth)acrylate), or the like, without being limited thereto. These may be used alone or in combination thereof.

For example, the crosslinking agent may be a polyfunctional (meth)acrylate of a multivalent alcohol having 2 to 20 hydroxyl groups.

In addition, the crosslinking agent may employ isocyanate, epoxy, aziridine, melamine, amine, imide, carbodiimide, amide crosslinking agents, or mixtures thereof.

The crosslinking agent may be present in an amount of about 0.001 parts by weight to about 5 parts by weight, for example, about 0.01 parts by weight to about 5 parts by weight, 0.03 parts by weight to 3 parts by weight, or 0.05 parts by weight to 2 parts by weight, based on 100 parts by weight of the total amount of (A) and (B), or the total amount of (A), (B) and (E). For example, the crosslinking agent may be present in an amount of about 0.01, 0.1, 0.2, 0.3, 0.4, 0.5, 0.6, 0.7, 0.8, 0.9, 1, 2, 3, 4 or 5 parts by weight, based on 100 parts by weight of the total amount of (A) and (B), or the total amount of (A), (B) and (E).

The crosslinking agent may be present in an amount of about 0.01 wt % to about 5 wt %, for example, about 0.03 wt % to about 3 wt % in the adhesive composition. Within this range, the adhesive composition may increase the degree of crosslinking while maintaining tack of the adhesive film.

Non-Curable Compound

Details of the non-curable compound are as described above.

The non-curable compound may have a lipophilic property due to the aromatic rings, whereas a binder including a urethane(meth)acrylate copolymer, a (meth)acrylic copolymer and the like constituting the adhesive composition described above has hydrophilic properties. Thus, it is important to provide a suitable mixing ratio between the non-curable compound, the urethane(meth)acrylate copolymer and the (meth)acrylic copolymer.

The non-curable compound may be present in an amount of about 0 to 20 wt %, for example, from about 0.1 wt % to about 20 wt %, from 0.1 wt % to 15 wt %, or from about 5 wt % to 15 wt %, in the adhesive composition.

The non-curable compound may be present in an amount of about 1 part by weight to about 30 parts by weight, for example, about 5 parts by weight to about 15 parts by weight, based on 100 parts by weight of the total amount of (A), (B) and (E). For example, the non-curable compound may be present in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30 parts by weight, based on 100 parts by weight of the total amount of (A), (B) and (E). Within this range, the adhesive composition may reduce film shrinkage under high temperature and high humidity conditions.

The adhesive composition may optionally further include typical additives, such as silane coupling agents (silane compounds), curing accelerators, ionic liquids, lithium salts, inorganic fillers, softening agents, antioxidants, anti-aging agents, stabilizers, tackifier resins, modifying resins, such as polyol, phenol, acrylic, polyester, polyolefin, epoxy, epoxidized polybutadiene resins, or the like, leveling agents, antifoaming agents, plasticizers, dyes, pigments such as coloring pigments, extender pigments, or the like, treatment agents, UV protective agents, fluorescence brightening agents, dispersants, heat stabilizers, light stabilizers, UV absorbents, antistatic agents, lubricants, or solvents, as needed.

The silane coupling agents may further include an epoxy silane coupling agent, without being limited thereto.

The additive (for example, silane coupling agent) may be present in an amount of about 0.01 part by weight to about 5 parts by weight, for example, about 0.03 parts by weight to about 3 parts by weight, or about 0.05 parts by weight to 2 parts by weight based on 100 parts by weight of the total of (A) and (B), or the total of (A), (B) and (E).

The adhesive composition may have a viscosity at 25° C. of about 500 cps to about 50,000 cps.

The adhesive composition may be used to attach an optical film including a polarizing film, and a transparent electrode film.

The method of preparing an adhesive film according to the present invention includes preparing a (meth)acrylic oligomer by polymerizing a monomer mixture including at least two of an alkyl(meth)acrylate containing a $C_1$ to $C_{20}$ alkyl group, a (meth)acrylate containing an alicyclic group, a monomer containing a hydroxyl group, a monomer containing a carboxylic acid, and a (meth)acrylate containing a hetero-alicyclic group; mixing the (meth)acrylic oligomer with a urethane(meth)acrylic copolymer, an initiator, and a crosslinking agent to prepare an adhesive composition; and UV curing the adhesive composition.

The adhesive composition may further include a non-curable compound.

The (meth)acrylic oligomer is free from a solvent and may have a viscosity at 25° C. of about 1,000 cps to about 50,000 cps.

Another embodiment of the present invention provides a display unit. The display unit may include an optical film; and the adhesive film attached to one or both sides of the optical film. Examples of the optical film may include transparent electrode films, such as touch panels, windows, polarizing plates, color filters, retardation films, elliptical polarizing films, reflective films, anti-reflective films, compensation films, brightness enhancing films, alignment films, light diffusion films, glass anti-scattering films, surface protective films, plastic LCD substrates, indium tin oxide (ITO), fluorinated tin oxide (FTO), aluminum doped zinc oxide (AZO), carbon nanotube (CNT) containing films, Ag nanowire containing films, graphene, and the like. The optical film may be easily prepared by those skilled in the art using a typical method known in the art. For example, a touch panel may be prepared by attaching a touchpad to a window or optical film using the adhesive film. Alternatively, the adhesive film may be applied to a typical polarizing film as in the related art. Examples of the display unit may include an organic light emitting device display, a liquid crystal display device, and the like, without being limited thereto.

FIG. 1 is a sectional view of a display apparatus of an organic light emitting device in accordance with one embodiment of the present invention.

Referring to FIG. 1, a display apparatus 100 of an organic light emitting device includes a substrate 10, an element for an OLED 15 formed on the substrate 10, an encapsulation layer 20 encapsulating the element for an OLED 15, a first adhesive film 25 formed on the encapsulation layer 20, a transparent conductor formed on the first adhesive film 25 and including a matrix 35, a first transparent conductive layer 40 formed on the matrix 35 and a second transparent conductive layer 30 formed under the matrix 35, a polarizing plate 45 formed on the first transparent conductive layer 40, a second adhesive film 50 formed on the polarizing plate 45, and a window 55 formed on the second adhesive film 50, wherein at least one of the first adhesive film 25 and the second adhesive film 50 may be an adhesive film according to one embodiment of the invention.

The substrate 10 may be a typical substrate for display units of organic light emitting devices. For example, the substrate 10 may be a TFT substrate. In one embodiment, the substrate 10 may be a glass substrate, or a plastic substrate such as a polyimide substrate, epoxy substrate, acryl substrate, silicone substrate, or the like. Alternatively, the substrate may be a flexible substrate.

Although not shown in FIG. 1, the element 15 for an OLED refers to a component typically used in the display unit of the OLED, and may include a first electrode, a second electrode, and an organic electroluminescent layer, which is formed between the first and second electrodes by sequentially stacking a hole injection layer, a hole transport layer, a light emitting layer, an electron transport layer, and an electron injection layer, without being limited thereto.

The encapsulation layer 20 protects the element 15 for an OLED from external moisture or oxygen, and may be formed of an inorganic material, an organic material, or a mixture thereof.

The transparent conductor has electrical conductivity and generates electric signals in response to external stimulation. The transparent conductor may include the matrix 35 and the first and second transparent conductive layers 40 and 30 formed on both surfaces of the matrix 35. The matrix 35 may be an optically transparent film (for example, polycarbonate or polyester films including polyethylene terephthalate films, or the like), or a glass substrate. The first and second transparent conductive layers 40 and 30 may be formed of the same material or different materials, and may be formed of any suitable material, for example, indium tin oxide (ITO) films or metal nanowire-containing films so long as the materials of the first and second transparent conductive layers are transparent conductive films having conductivity. Although not shown in FIG. 1, the first transparent conductive layer 40 and/or the second conductive layer 30 may be subjected to patterning.

The first adhesive film 25 serves to adhere the encapsulation layer 20 to the second transparent conductive layer 30, and the second adhesive film 50 serves to adhere the first transparent conductive layer 40 to the window 55. The first and second adhesive films 25 and 50 may be formed of the same or different materials, and may include the adhesive film according to one embodiment of the invention, without being limited thereto.

The polarizing plate 45 serves to reduce or prevent reflection in the organic light emitting device. Although not shown in FIG. 1, the polarizing plate may include a polarizer, a protective film on the polarizer, and/or a retardation film, without being limited thereto.

The window 55 acts as a display screen, and may be formed of glass or plastic materials. Alternatively, the window may be formed of a flexible material.

Figure 2:
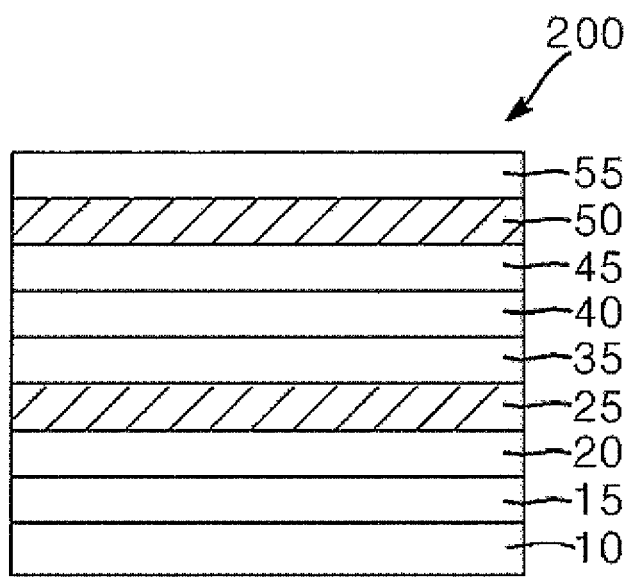
FIG. 2 is a sectional view of a display unit of an organic light emitting device in accordance with another embodiment of the present invention.

FIG. 2 is a sectional view of a display apparatus of an organic light emitting device in accordance with another embodiment of the present invention.

Referring to FIG. 2, a display apparatus 200 of an organic light emitting device includes a substrate 10, an element for an OLED 15 formed on the substrate 10, an encapsulation layer 20 encapsulating the element for an OLED 15, a first adhesive film 25 formed on the encapsulation layer 20, a transparent conductor formed on the first adhesive film 25 and including a matrix 35 and a first transparent conductive layer 40 formed on the matrix 35, a polarizing plate 45 formed on the first transparent conductive layer 40, a second adhesive film 50 formed on the polarizing plate 45, and a window 55 formed on the second adhesive film 50, wherein at least one of the first adhesive film 25 and the second adhesive film 50 may be an adhesive film according to one embodiment of the invention.

The display unit according to this embodiment is the same as the display unit according to the above embodiment except for the second transparent conductive layer 30.

In addition, the display units for organic light emitting devices according to the embodiments of the invention may omit the encapsulation layer 20 and/or the polarizing plate 45, if there is no problem in normal operation of the display unit.

Next, embodiments of the present invention will be explained in more detail with reference to some examples. However, it should be understood that these examples are provided for illustration only and are not to be in any way construed as limiting the scope of the present invention.

Preparation Example

Preparation of (Meth)Acrylate Copolymer

To a four-neck 2L flask, 80 g of polypropylene glycol (PPG) and 10 g of 1,4-butanediol were charged, followed by attaching a reflux condenser, a thermometer, a dropping funnel thereto. After the temperature of the solution in the flask reached 60° C., 1.3 g of dibutyltin dilaurate (DBTDL) diluted with toluene in a ratio (concentration) of 10% was added.

After adding 9 g of isophorone diisocyanate (IPDI), the temperature of the solution was increased to 75° C. and maintained. After monitoring that —NCO groups of IPDI were completely reacted, the resultant was cooled to 50° C. and 2 g of 2-hydroxyethyl methacrylate (2-HEMA) and 1 g of methanol were added to the resultant. After the resultant was maintained at 50° C. for 3 hours, it was ascertained through IR that NCO groups disappeared, followed by cooling the resultant to 40° C. and packaging the resultant. A urethane(meth)acrylate copolymer having a viscosity at 25° C. of 500 cps to 100,000 cps and a weight average molecular weight (Mw) of 1,000 g/mol to 150,000 g/mol was prepared.

Details of components used in Examples and Comparative Examples are as follows:

(A) Urethane(meth)acrylic copolymer: Urethane(meth)acrylic copolymer of Preparation Example (B) Monomers for (meth)acrylic copolymer: AA (acrylic acid), EHA (2-ethylhexyl acrylate), IBOA (isobornyl acrylate), ACMO (acryloyl morpholine), HEA (2-hydroxyethyl acrylate)

(C) Initiator: Irgacure™ 651 (2,2-dimethoxy-2-phenylacetophenone) (manufactured by Ciba Japan K.A.)

(D) Crosslinking agent: HDDA (1,6-hexanediol diacrylate)

(E) Non-curable compound: A compound of Formula 1a (Xylene resin NIKANOL, FUDOW (Japan))

Formula 1a

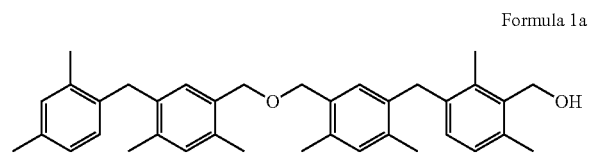 [SMILES: Cc1ccc(Cc2cc(COCc3cc(Cc4ccc(C)c(CO)c4C)c(C)cc3C)c(C)cc2C)c(C)c1]

Examples 1 to 4 and Comparative Examples 1 to 3

Viscous liquids having a viscosity at 25° C. of 500 cps to 20,000 cps were prepared by mixing the component (B) in an amount as listed in Table 1 (unit: part by weight) and 0.04 parts by weight of the component (C) in a glass container, followed by replacing dissolved oxygen with nitrogen gas, and partially polymerizing the mixture through irradiation using a low pressure lamp for a few minutes. To the prepared liquids, the component (A), the component (D), the component (E) in amounts as listed in Table 1, and 0.26 parts by weight of component (C) were added and sufficiently mixed to prepare an adhesive composition.

The prepared adhesive composition was applied onto a polyethylene terephthalate film (PET, a release film) as a 50 μm thick polyester film, followed by performing release treatment to a layer having a thickness of 100 μm. In order to remove oxygen, which may influence polymerization, the release film was covered, and irradiated on two surfaces using a low pressure lamp for about 3 minutes to obtain a transparent adhesive sheet.

TABLE 1

|   |   | Example 1 | Example 2 | Example 3 | Example 4 | Comparative Example 1 | Comparative Example 2 | Comparative Example 3 |
|---|---|---|---|---|---|---|---|---|
| (A) |  | 25 | 15 | 15 | 15 | 15 | 15 | 0 |
| (B) | AA | 0 | 0 | 0 | 3 | 0 | 0 | 0 |
|  | EHA | 40 | 40 | 42.5 | 43 | 33.5 | 45.5 | 50 |
|  | IBOA | 9.5 | 9.5 | 10 | 9.5 | 10 | 4 | 19.5 |
|  | ACMO | 6 | 6 | 3 | 0 | 12 | 2 | 6 |
|  | HEA | 19.5 | 19.5 | 19.5 | 19.5 | 19.5 | 15.5 | 24.5 |
| (C) |  | 0.3 | 0.3 | 0.3 | 0.3 | 0.3 | 0.3 | 0.3 |
| (D) |  | 0.2 | 0.2 | 0.2 | 0.2 | 0.2 | 0.2 | 0.2 |
| (E) |  | 0 | 10 | 10 | 10 | 10 | 18 | 0 |
| Preparation Method |  | UV curing | UV curing | UV curing | UV curing | UV curing | UV curing | UV curing |

The following physical properties of the prepared adhesive films prepared in Examples and Comparative Examples were evaluated and the results are shown in Table 2.

(1) Resistance variation (ΔR): Each of the adhesive films prepared in Examples and Comparative Examples was attached to an ITO PET film and electrodes were formed on both sides thereof using a silver paste, thereby preparing a sample. Initial resistance ($P_1$) of the sample was measured. The sample was left at 60° C./90% RH (relative humidity) for 240 hours, followed by evaluation of resistance ($P_2$). Here, resistance was measured using a portable tester for measuring resistance, voltage, and current (Checkman, Tae Kwang Electronics Co.). To calculate resistance variation (ΔR, %), the obtained resistances under the above conditions were substituted into Equation 1.

$$\Delta R = \frac{P_2 - P_1}{P_1} \times 100, \quad \text{Equation 1}$$

wherein $P_2$ is resistance after storage at 60° C./90% RH for 240 hours of an adhesive film and $P_1$ is initial resistance of an adhesive film.

(2) Peel strength (gf/25 mm): An adhesive film was attached to an ITO film using a 50 μm thick PET film (backing film) and left for 30 minutes. Then, peel strength was measured at a rate of 300 mm/min using a texture analyzer TA.XT Plus (Stable Micro Systems).

(3) Tackiness ((g/mm)): After detaching a PET release film from the adhesive sheet, the adhesive sheet was laminated on a flat plate using a 2 kg roller, followed by cutting the adhesive sheet to a size of 30 mm×30 mm (for example, a width and a length in the range from 30 mm to 50 mm). After attaching the cut sheet to a hot plate having a predetermined temperature, tack was measured under set or predetermined measurement conditions (Test speed: 0.01 mm/sec, post speed: 10 mm/sec, applied force: 800 g, contact time: 0.01 sec).

(4) Shear strength (kg): An adhesive film having a size of 25 mm×25 mm, an ITO PET film having a size of 25 mm×70 mm and a glass plate having a size of 25 mm×70 mm were used. With one release side of the adhesive film removed, the ITO PET film was laminated to the adhesive film, followed by cutting the film to a width of 25 mm and laminating the film onto the glass plate. Two samples were prepared for each test sample or stage. With the glass plate secured, shear strength was measured by pulling the ITO PET film using a UTM (Universal Testing Machine).

(5) Durability: A specimen was prepared by laminating an adhesive film on an ITO film, followed by laminating a glass sheet or a polycarbonate film on the adhesive film. After autoclaving, the specimen was left at 60° C./90% RH for 500 hours, followed by observation with the naked eye to identify whether separation, peeling, or bubbling occurred between the adhesive film and the glass or polycarbonate film. Standard for evaluation was as follows:

◯: Excellent (No bubbling or peeling)

Δ: Good (Slight bubbling or peeling)

X: Poor (Severe bubbling or peeling)

Advanced Rheometric Expansion System (ARES) on an adhesive film sandwiched between two release films. One release film was removed from the adhesive film having a thickness of 100 μm, followed by attaching the adhesive film to a plate (diameter: 8 mm, circular form) by adjusting the diameters thereof. The other release film was removed from the adhesive film, followed by pressing the adhesive film using an upper plate (axial force). Storage modulus (G') and loss modulus (G") were measured through frequency sweep testing at a strain of 3% and a frequency of 1 rad/s at 30° C. to 80° C. Further, storage modulus (G') and loss modulus (G") were measured at 60° C., and tan δ was calculated from G"/G'.

(11) Glass transition temperature: The glass transition temperature of an adhesive film having a thickness of 150 μm was measured using a DSC tester (Thermal Analysis, Mettler Toledo).

TABLE 2

| | Example 1 | Example 2 | Example 3 | Example 4 | Comparative Example 1 | Comparative Example 2 | Comparative Example 3 |
|---|---|---|---|---|---|---|---|
| Resistance variation (%) | 2.0 | 2.0 | 2.1 | 2.6 | 2.1 | 2.2 | 2.1 |
| Peel strength (gf/25 mm) | 2000 | 2200 | 2300 | 2400 | 3200 | 1800 | 3600 |
| Tackness (g/mm) | 1800 | 1900 | 1950 | 2070 | 1900 | 2010 | 2000 |
| Shear strength (kg, 25° C.) | 29 | 30 | 31 | 34 | 35 | 20 | 41 |
| Durability | ◯ | ◯ | ◯ | ◯ | ◯ | X | X |
| Optical Properties Transmittance (%) | 93.1 | 93.2 | 93.4 | 93.0 | 93.2 | 89.1 | 92.2 |
| YI | 0.6 | 0.6 | 0.5 | 0.6 | 0.5 | 0.6 | 0.5 |
| Haze (%) | 0.4 | 0.3 | 0.4 | 0.5 | 0.6 | 0.4 | 0.5 |
| Hardness | 10 | 10 | 10.1 | 11.1 | 11 | 10.5 | 12 |
| Refractive index | 1.49 | 1.49 | 1.49 | 1.49 | 1.49 | 1.50 | 1.49 |
| Reliability (After 250 h, observing occurrence of spots upon operation) | ◯ | ◯ | ◯ | ◯ | X | X | X |
| Storage modulus at 60° C. (dyn/cm$^2$) | $1.40 \times 10^5$ | $1.14 \times 10^5$ | $2.32 \times 10^5$ | $2.40 \times 10^5$ | $8.42 \times 10^5$ | $0.92 \times 10^5$ | $6.21 \times 10^5$ |
| Loss modulus at 60° C. (dyn/cm$^2$) | $6.25 \times 10^4$ | $6.19 \times 10^4$ | $6.32 \times 10^4$ | $6.10 \times 10^4$ | $4.20 \times 10^4$ | $8.22 \times 10^4$ | $4.24 \times 10^4$ |
| tan δ | 0.446 | 0.543 | 0.272 | 0.254 | 0.050 | 0.893 | 0.068 |
| Glass transition temperature (° C.) | −25 | −27 | −26 | −24 | −18 | −22 | −26 |

(6) Optical properties: The adhesive composition was coated onto a PET release film, followed by curing at 3000 mJ/cm$^2$ to prepare an adhesive film having a thickness of 200 μm. After removing the release film, optical properties of the adhesive film having a thickness of 200 μm were measured at a wavelength ranging from 400 nm to 800 nm using a Lambda 950 tester (Perkin Elmer Co., Ltd.).

(7) Hardness: Hardness of a 175 μm thick adhesive film was measured using a rubber hardness tester TECLOCK GS-709G (type A).

(8) Refractive index: Refractive index was measured in accordance with ASTM D1218. The adhesive composition was coated onto a PET release film and cured at a total intensity of 3000 mJ/cm$^2$, followed by measuring index of refraction using a tester ABBE5 (Bellingham/Stanley Ltd.).

(9) Reliability: A touch screen panel (TSP) was assembled to an LCD panel using an OCA film. Reliability was evaluated by observing occurrence of spots upon operation. No spot was evaluated as ◯ and occurrence of spots was evaluated as X.

(10) Storage modulus, loss modulus and tan δ: Storage modulus, loss modulus and tan δ were measured using an As shown in Table 2, the adhesive film according to embodiments of the present invention exhibited no warpage during reliability evaluation, had suitable peel strength, thereby ensuring adhesion and reworkability, and had excellent durability. Thus, even when applied to medium and large 5" to 50" displays, the adhesive film according to embodiments of the present invention provides various enhancements, such as no deterioration in capabilities of display units, no warpage and spots, good reliability, no peeling and bubbling by change in environment, good durability, no pattern visibility, and the like.

It should be understood that various modifications, changes, alterations, and equivalent embodiments may be made by those skilled in the art without departing from the spirit and scope of the invention, defined by the following claims, and equivalents thereof.

What is claimed is:

1. An adhesive film comprising a cured product of an adhesive composition comprising:
   a urethane(meth)acrylate copolymer comprising a urethane functional group; and a (meth)acrylic copolymer of a monomer mixture comprising an alkyl(meth)acrylate containing a $C_1$ to $C_{20}$ alkyl group, an alicyclic(meth)acrylate containing an alicyclic group and a monomer containing a hydroxyl group, wherein the adhesive film has a glass transition temperature (Tg) of about −20° C. or lower, a loss modulus of about $4 \times 10^4$ dyn/cm² to about $8 \times 10^4$ dyn/cm² upon frequency sweep testing under conditions of a strain of 3%, 60° C. and 1 rad/s, and tan δ of about 0.2 to 0.55 upon frequency sweep testing under conditions of a strain of 3%, 60° C. and 1 rad/s.

2. The adhesive film according to claim 1, wherein the adhesive film has a storage modulus of about $4 \times 10^4$ dyn/cm² or more upon frequency sweep testing under conditions of a strain of 3%, 60° C. and 1 rad/s.

3. The adhesive film according to claim 1, further comprising:
a non-curable compound.

4. The adhesive film according to claim 3, wherein the non-curable compound has a structure represented by Formula 1-1 or 1-2:

A1-(—CH₂O—)$_{n1}$-(—CH₂—)$_{m1}$-A2-(—CH₂O—)$_{n2}$-(—CH₂—)$_{m2}$-A3-(—CH₂O—)$_{n3}$-(—CH₂—)$_{m3}$-A4  Formula 1-1

A1-(—CH₂O—)$_{n1}$-(—CH₂—)$_{m1}$-A2-(—CH₂O—)$_{n2}$-(—CH₂—)$_{m2}$-A3-(—CH₂O—)$_{n3}$-(—CH₂—)$_{m3}$-A4-(—CH₂O—)$_{n4}$-(—CH₂—)$_{m4}$-A5  Formula 1-2 wherein n1, n2, n3, n4, m1, m2, m3 and m4 are independently an integer from 0 to 10, and n1 and m1 are not both 0, n2 and m2 are not both 0, n3 and m3 are not both 0, and n4 and m4 are not both 0; and in Formula 1-1, A1 and A4 are each independently represented by Formula (a), and A2 and A3 are each independently represented by one of Formula (b), (c) or (d), and in Formula 1-2, A1 and A5 are each independently represented by Formula (a), and A2, A3 and A4 are each independently represented by one of Formula (b), (c) or (d):

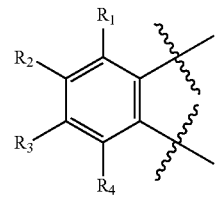

Formula (a)

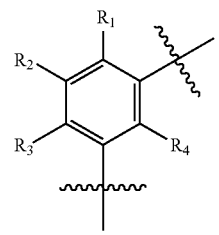

Formula (b)

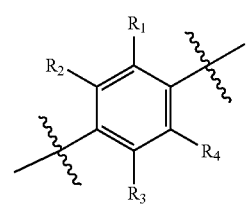

Formula (c)

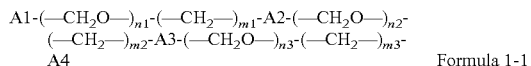

Formula (d)

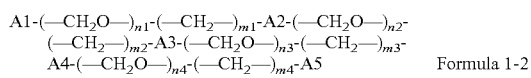

wherein $R_1$, $R_2$, $R_3$, $R_4$ and $R_5$ are the same or different and are independently selected from the group consisting of hydrogen, a linear or branched $C_1$ to $C_{10}$ alkyl group, a hydroxyl group, a $C_1$ to $C_{10}$ alkyl group substituted with a hydroxyl group, and -(—CH₂—)$_s$-O-[—CH₂—CH₂O—]$_t$-CH₂CH₂OH where s is an integer from 0 to 5 and t is an integer from 0 to 5; and at least one of $R_1$, $R_2$, $R_3$, $R_4$ and $R_5$ is a hydroxyl group, a $C_1$ to $C_{10}$ alkyl group substituted with a hydroxyl group, or -(—CH₂—)$_s$-O-[—CH₂—CH₂O—]$_t$-CH₂CH₂OH where s is an integer from 0 to 5 and t is an integer from 0 to 5.

5. The adhesive film according to claim 4, wherein the non-curable compound comprises at least one of the structures represented by Formulae 1a to 1e:

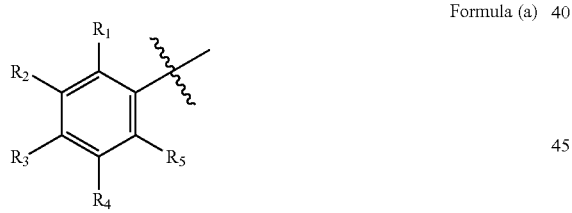

Formula 1a

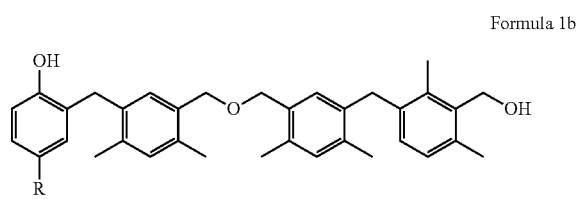

Formula 1b

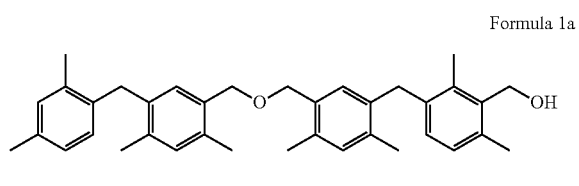

Formula 1c

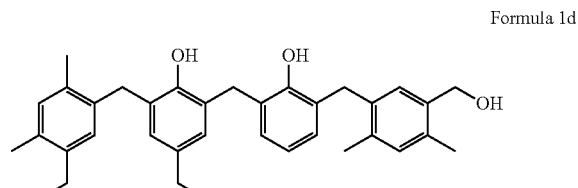

Formula 1d

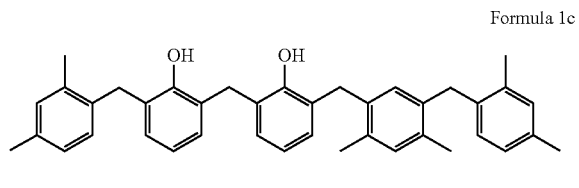

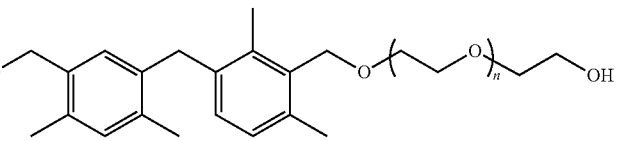

Formula 1e wherein R is hydrogen, a hydroxyl group or methyl group, and n is an integer from 0 to 5.

6. The adhesive film according to claim 3, wherein the non-curable compound is present in an amount of about 0.1 wt % to about 15 wt % in the adhesive film.

7. The adhesive film according to claim 1, wherein the urethane(meth)acrylate copolymer is a monofunctional (meth)acrylate comprising a single (meth)acrylate functional group.

8. The adhesive film according to claim 1, wherein the urethane(meth)acrylate copolymer is present in an amount of about 11 wt % to about 40 wt % in the adhesive composition in terms of solid content.

9. The adhesive film according to claim 1, wherein the monomer mixture of the (meth)acrylic copolymer further comprises a monomer containing a carboxylic acid group, a (meth)acrylate containing a hetero-alicyclic group, or a combination thereof.

10. The adhesive film according to claim 1, wherein the adhesive composition further comprises at least one of an initiator and a crosslinking agent.

11. The adhesive film according to claim 10, wherein the adhesive composition comprises about 11 wt % to about 40 wt % of the urethane(meth)acrylate copolymer, about 50 wt % to about 80 wt % of the (meth)acrylic copolymer, about 0.001 wt % to about 5 wt % of the initiator, and about 0.01 wt % to about 5 wt % of the crosslinking agent, in terms of solid content.

12. The adhesive film according to claim 10, wherein the adhesive composition further comprises a non-curable compound.

13. The adhesive film according to claim 12, wherein the adhesive composition comprises about 11 wt % to about 40 wt % of the urethane(meth)acrylate copolymer, about 50 wt % to about 80 wt % of the (meth)acrylic copolymer, about 0.001 wt % to about 5 wt % of the initiator, about 0.01 wt % to about 5 wt % of the crosslinking agent, and about 0.1 wt % to about 15 wt % of the non-curable compound, in terms of solid content.

14. The adhesive film according to claim 12, wherein the adhesive film has a thickness of about 10 μm to about 2 mm.

15. A display apparatus comprising:
an optical film; and
the adhesive film according to claim 1 attached to one or both sides of the optical film.

16. The display apparatus according to claim 15, wherein the optical film is selected from the group consisting of touch panels, windows, polarizing plates, color filters, retardation films, elliptical polarizing films, reflective films, anti-reflective films, compensation films, brightness enhancing films, alignment films, light diffusion films, glass anti-scattering films, surface protective films, plastic LCD substrates, indium tin oxide (ITO) containing films, fluorinated tin oxide (FTO) containing films, aluminum doped zinc oxide (AZO) containing films, carbon nanotube (CNT) containing films, Ag nanowire containing films, and graphene.

* * * * *